(12) United States Patent
Joffe et al.

(10) Patent No.: US 6,600,750 B1
(45) Date of Patent: Jul. 29, 2003

(54) EMAIL TO FAX PROCESSING WHEN NO SECONDARY STORAGE IS AVAILABLE

(75) Inventors: Neil Raymond Joffe, Palo Alto, CA (US); Ilya Umansky, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/272,811

(22) Filed: Mar. 19, 1999

(51) Int. Cl.[7] .......................... H04L 12/46; H04L 12/66; H04N 1/00; H04N 1/32; G06F 13/00

(52) U.S. Cl. ....................... 370/401; 370/428; 370/465; 358/1.15; 358/402; 358/407; 379/88.13; 379/88.17; 379/93.15; 379/93.24; 709/203

(58) Field of Search ................................. 370/352, 354, 370/356, 389, 400, 401, 428, 429, 465, 466, 467; 358/1.15, 402, 403, 407, 425, 440; 379/88.13, 88.14, 88.17, 88.25, 93.05, 93.06, 93.07, 93.14, 93.15, 93.24, 100.01, 100.12, 100.13, 100.17; 709/201, 203, 206, 207, 249, 250

(56) References Cited

U.S. PATENT DOCUMENTS

| 4,918,722 A | 4/1990 | Duehren et al. | 379/100 |
|---|---|---|---|
| 5,291,546 A | 3/1994 | Giler et al. | 379/100 |
| 5,369,686 A | 11/1994 | Dutra et al. | 379/94 |
| 5,488,651 A | 1/1996 | Giler et al. | 379/100 |
| 5,712,907 A | 1/1998 | Wegner et al. | 379/112 |
| 5,767,985 A | 6/1998 | Yamamoto et al. | 358/402 |
| 5,805,298 A | 9/1998 | Ho et al. | 358/402 |
| 5,812,278 A | 9/1998 | Toyoda et al. | 358/402 |
| 5,838,683 A | 11/1998 | Corley et al. | 370/408 |
| 6,023,345 A * | 2/2000 | Bloobfield | 358/402 |
| 6,028,679 A * | 2/2000 | Murphy | 358/407 |
| 6,061,502 A * | 5/2000 | Ho et al. | 395/114 |
| 6,411,393 B1 * | 6/2002 | Wakasugi | 358/1.15 |
| 6,417,930 B2 * | 7/2002 | Mori | 358/1.15 |

FOREIGN PATENT DOCUMENTS

WO    WO 97/18665    5/1997    ............ H04N/1/32

* cited by examiner

Primary Examiner—Alpus H. Hsu
(74) Attorney, Agent, or Firm—Law Offices of Imam

(57) ABSTRACT

An email communication system employed in a packet switching network environment for transmission of an email message including at least one fax message for use by fax recipient(s), through the packet switching network environment, includes a network device for communication with one or more mail servers. The mail servers are responsive to an email message having at least one tax message received from an email user. The network device receives the email message, through a forward connection, from one of the mail servers and converts the received email message into the fax message for transmission thereof to at least one fax recipient. The network device further starts to transmit the email message with context information appended thereto, forming a reverse email message, back to one of the mail servers, wherein the mail server is used to store the reverse email message until the mail server is ready to send the same to the network device thereby avoiding the need for secondary storage within the network device.

38 Claims, 4 Drawing Sheets

EMAIL TO FAX PROCESSING WHEN NO SECONDARY STORAGE IS AVAILABLE

BACKGROUND OF THE INVENTION

1. Field of the Invention

This invention relates to the field of data transmission systems, and particularly data transmission systems employing networking equipment for transmission of digital information in the form of facsimile transmission to various communications equipment.

2. Description of the Prior Art

Facsimile (fax) messages, in modern-day systems, are oftentimes stored and transmitted in the form of email messages. The originating flax machine typically transmits a fax message through Public Switching Telephone Network (PSTN) communications links to a router device, known as an on-ramp gateway router. A router is a device which selects a path that information can take through a packet switching network environment. This requires the router to have an understanding of the network and how to determine the best route for the path. The on-ramp gateway router transforms the fax message contained in an email message into a Tagged Image File Format (TIFF) file and sends the latter as an email message to another router, known as an off-ramp gateway router (sometimes referred to as an 'edge router', an edge router is a router having telephony equipment and being coupled on one side to a mail server and on the other side to various communications devices, such as tax machines, through PSTN communications links, accordingly, edge routers are capable of making phone calls). An edge router transforms the email message containing fax information into a tax message, which may be in the form of a TIFF file, for transmission thereof, through PSTN communications links, to a final destination, commonly a receiving fax machine or a device capable of receiving fax information.

This process is not restricted to fax messages. Indeed, any email message can be transformed by the edge router into a fax message and transmitted through PSTN to a destination fax machine. The original email message need not have been produced by a fax machine but could, for example, have come from a Personal Computer (PC) or a modem device.

At present, there are several limitations associated with the part of this process which involves the edge router. An example of an edge router is the AS5300 model (a router device manufactured by Cisco Systems, Inc. of San Jose, Calif.), which has no secondary storage space, such as a hard disk or other known mass storage into which the entire email message or multiple copies thereof can be stored. Storage of the email message allows for ease of reconstruction of the originally-transmitted email or fax message, which is transmitted in packet form. This is perhaps better understood with a brief discussion of the transmission of fax information via email messages.

Email messages are transmitted to router devices through the Internet using an Internet Protocol (IP) standard. Similarly, fax contents of an email message is transmitted through the Internet in packet form. An edge router, which receives the email message, can either send the parsed fax information through the Internet again or it can send it through other communications protocol, such as the PSTN, to receiving fax device(s). Information and therefore email messages travel through the Internet in the form of packets. That is, the message is apportioned into various pieces, referred to as packets, at its originating site and each packet is then sent to the router device separately. Packets belonging to a particular email message are collected by the receiving edge router and appended together in the order in which they were sent to form the originally-transmitted email message. The fax information that is contained in the email message is similarly apportioned into packets prior to transmission thereof to the router. The latter then parses the fax information to form the originally-transmitted fax information and sends the same to fax receiving device(s).

With respect to routers that do not include secondary storage space (such as the Cisco router referred to earlier), there is commonly volatile memory, such as random access memory (RAM), made available for storing one or a few packets of fax information. One of the reasons for the desire to eliminate hard disk or secondary storage space from routers is to reduce the size of the router thereby reducing costs of manufacturing. This discussed at length in a U.S. patent application Ser. No. 09/227,115, entitled "FAX BROADCAST FROM A SINGLE COPY OF DATA", filed on Jan. 8, 1999, the inventors of which are Neil Joffe and Greg Mercurio and the disclosure of which is herein incorporated by reference in its entirety. Another reason for eliminating hard disk in routers is due to the unreliability associated with hard disks in light of the use of mechanical parts in, for example, present-day hard disks. As can be appreciated, mechanical parts generally become defective faster than electrical parts, which is, in part, the cause for the unreliability associated with hard disks.

Accordingly, at any given time, a router device that does not include a secondary storage space and which receives email message can process only a limited number of packets of the email message given the limited amount of memory or storage space contained therein. This limited memory or lack of a secondary memory provides advantages such as a smaller router size, less expensive manufacturing costs and additional reliability as earlier discussed. More details of such routers is described in the U.S. patent application referred to hereinabove.

Once a packet of the message has been processed and transmitted by the router, it is removed or deleted from memory in order to allow available storage space for the next in-coming packet.

Some messages require multiple transmission passes before they are adequately parsed. This poses a problem where transmitted messages cannot be stored in secondary storage. That is, by the time the last packet of the message is processed, the first packet may have been removed from memory and thus no longer available for processing.

For example, assuming that the edge router is transmitting a message consisting of 10 pages of fax contents and further assuming that for some reason, such as malfunction of the receiving fax machine, the fax transmission fails at page 5 there will be no history of transmission maintained in the router's memory. Thus, rather than sending pages 5–10, the entire message, starting from page 1, must be transmitted one more time.

An example of a prior art network system is shown in FIG. 1 where a mail server 10 is in communication with an array of edge routers having an 'n' number of edge routers.

The mail server 10 sends two messages, 12 and 14, to the first router 18 and another message 22 to the router 20. In the case of failure to successfully send the message(s) to communications device recipients (not shown) that are coupled to, for example, router 18, the router 18 sends an error, message 16 to the mail server, which, in turn, must again request re-transmission of the original message and re-sends the same back to the router 18. This is not only inefficient but it is also expensive in that the message is transmitted in its entirety and adds further PSTN connection time.

The problem with prior art systems is that the address of the original message is an alias for an array of routers serving the local area. The mail server may send the message to a router other than the original router that was used to send the message initially. This is a problem in that because there is no history associated with the message, during re-transmission of the message, it is a requirement for the message to be processed by the same router that was initially used to process the message during the first transmission try.

There are further limitations of the present method of data transfer when more than one recipient fax machine is available. One such limitation is having different speeds associated with different fax machines (or recipients). In order to have proper modem transmission, the router must maintain several fax pages in advance of the fastest recipient in its memory. This is in addition to maintaining the fax pages not yet transmitted to the slowest fax recipient. There is therefore potentially an unbounded-memory problem presented where some fax recipients would have to be dropped in order to keep the memory space within bounds (prevent memory overrun).

Another limitation has to do with transmission of data to multiple recipients. In the event transmission is successful with some recipients and fails with others, there is no way of knowing which one of the recipients has successfully received the message thereby requiring the message to be transmitted to all of the recipients at least one more time.

The need therefore arises for a fax-over-email network system employed in the Internet environment for transmission of fax messages to one or more fax recipients while overcoming the foregoing, limitations as detailed below in the preferred embodiment(s).

SUMMARY OF THE INVENTION

Briefly, an embodiment of the present invention includes an email communication system employed in a packet switching network environment for transmission of an email message including at least one fax message for use by fax recipient(s), through the packet switching network environment, includes a network device for communication with one or more mail servers. The mail servers are responsive to an email message having at least one fax message received from an email user. The network device receives the email message, through a forward connection, from one of the mail servers and converts the received email message into the fax message for transmission thereof to at least one tax recipient. The network device further starts to transmit the email message with context information appended thereto, forming a reverse email message, back to one of the mail servers, wherein the mail server is used to store the reverse email message until the mail server is ready to send the same to the network device thereby avoiding the need for secondary storage within the network device.

These and other objects and advantages of the present invention will no doubt become apparent to those skilled in the art after having read the following detailed description of the preferred embodiment illustrated in several figures of the drawings.

IN THE DRAWING

DETAILED DESCRIPTION OF THE PREFERRED EMBODIMENTS

Figures 1, 5:
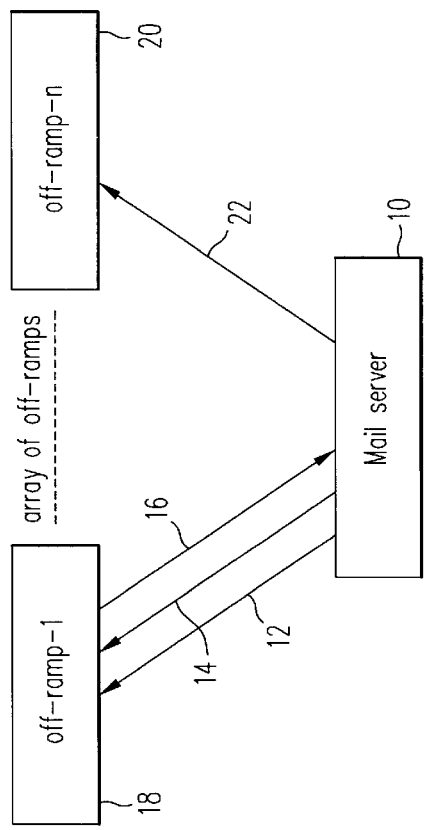
FIG. 1 illustrates a prior art system having a mail server 10 shown to be in communication with an array of off-ramp routers consisting of 'n' number of routers.
FIG. 5 shows an example of context information employed in the embodiment of FIGS. 2 and 3.
Figure 2:
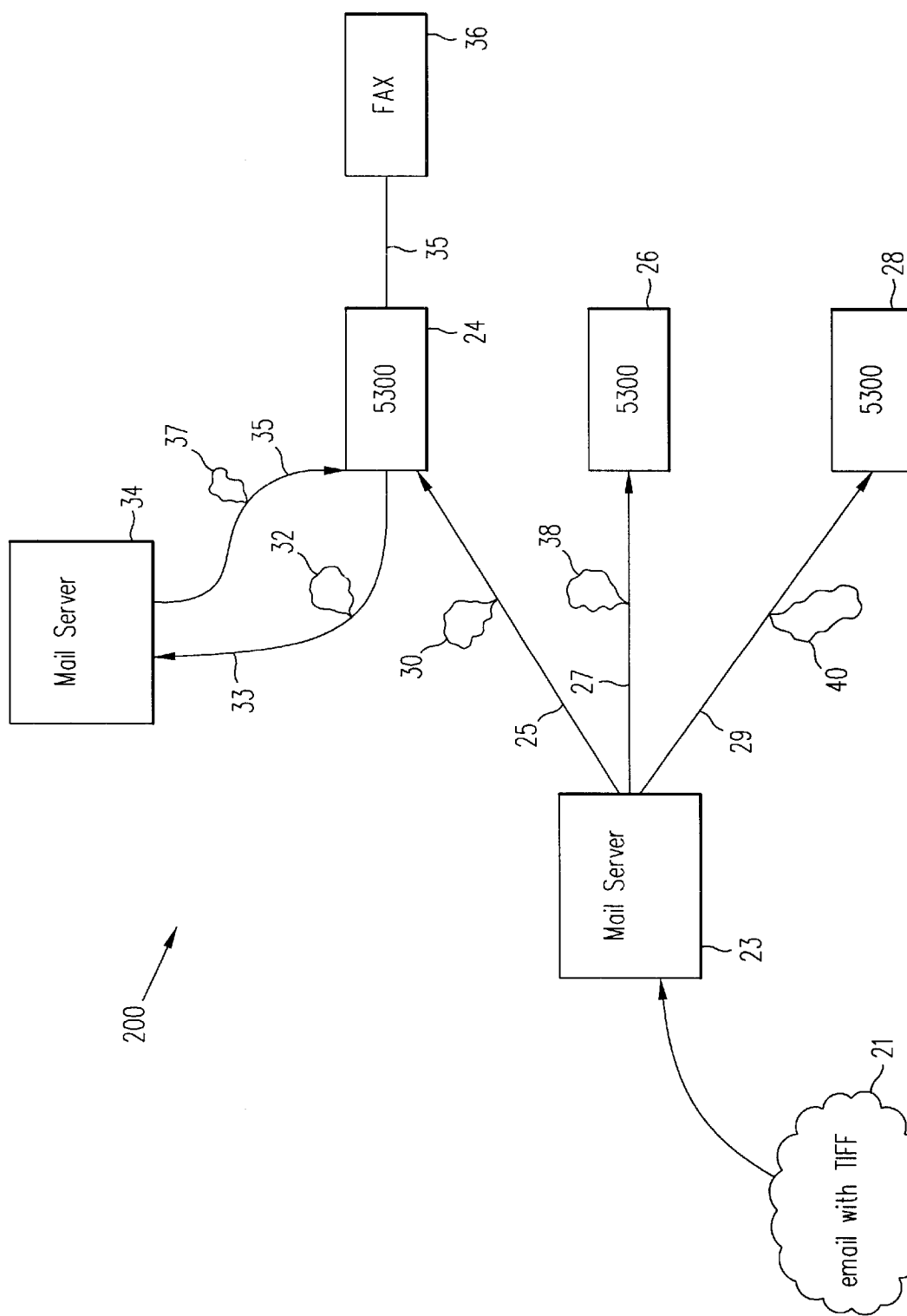
FIG. 2 shows a fax system 200 in accordance with an embodiment of the present invention.

Referring now to FIG. 2, a fax system 200 is shown in accordance with an embodiment of the present invention. Within the fax system 200, there is shown an email message 21 with TIFF file(s) attached thereto and for transmission thereof to a mail server 23. In the embodiment of FIG. 1, the email message 21 is originated from a fax machine (not shown) although alternatively, it could be originated by any other communications source, such as a Personal Computer (PC) and/or a modem device, having fax capability.

The mail server 23, in turn, sends out three email messages, 30, 38 and 40, to three routers, 24, 26 and 28, respectively, through a first, second and third communications links, 25, 27 and 29, respectively. In one embodiment of the present invention, each of the routers 24–28 is an AS5300 model edge router, manufactured by Cisco Systems. Inc. of San Jose. Other types of routers may be employed without departing from the spirit and scope of the present invention. The communications links 25–29 are each for communicating information between the mail server 23 and the routers 24–28 pursuant to an Internet Protocol (IP) commonly used and known to those in the industry.

Router 24 is shown to be connected to a fax machine 36. Routers 26 and 28 can be similarly connected to fax machines or alternatively, they can be connected to other types of receiving devices, such as modem or computers (not shown in FIG. 2). The router 24 is an edge router, transforming the email message 21 into a fax message by parsing the email contents of the message and when required, processing the TIFF file and thereafter transmitting the same, through the PSTN 35, to the fax machine 36.

Since the router 24 does not maintain any secondary storage capability, such as a hard disk or other types of mass storage media, it is not possible to store the entire email message 30 in the router 24 for purposes of parsing and transformation (or processing) of the fax message that is to be transmitted to the fax machine 36. This is particularly the case for large message sizes. In the present embodiment, this problem is overcome by passing the message several times through the router 24 (or perhaps other routers) with the use of context information (or the history of the message) accompanying the message at each pass. This is performed through the use of the mail server 34 or alternatively mail server 23.

Once the email message 30 arrives at the router 24, it is determined whether or not another pass of the message 30 (re-transmission between the mail server and the router) is necessary. Further passes are generally necessary when the router 24 has not completed processing of the fax contents that are included within the email message prior to transmission and use thereof by fax machines. Assuming this to be the case the router 24 makes multiple passes of the message 30, i.e. sends it multiple time's through mail servers, thereby using the mail servers as a way of storing the message 30 during processing of the fax contents. This is in part feasible due to the storage space available in mail servers.

It is important to note that once an email message is received by a router (the path from a mail server to a router, such as 25–29 in FIG. 2, is referred to as forward connection and the email message traveling through the forward connection may be referred to herein as the forward email message), there is a reverse connection (a path from a router to a mail server) established for communicating the original email message and context information relating to the email message, which will be discussed in more detail shortly. An example of a reverse connection is shown as 33 in FIG. 2. The email message and its context information, traveling through the reverse connection, are referred to as reverse email message at times in this document. In FIG. 2, the reverse email message is shown by the reference number 32.

If it is determined that another pass of the message 30 is not necessary, then the router 24 successfully completes the transaction and aborts the reverse connection. This entails decoding the email message and transforming it from email to fax format. These steps are discussed in further detail in the U.S. patent application referenced earlier herein. The transformed message, or fax message is then transmitted to the fax machine 36 through the PSTN 35. If, on the other hand, additional passes are required in order to parse the email message 30, then the context information acquired during the first pass is appended to the message 30 and the two are then transmitted to the mail server 34 through the link (or reverse connection) 33. The context information includes information regarding the fax message such as the number of pages successfully transmitted, the type of TIFF tile included, and the like. An example of context information is included herein at FIG. 5 and will be discussed relative to FIG. 5 later.

It should be noted that in accordance with the embodiments of the present invention, every time an email message is received by a router, the router during processing of the received email message establishes a reverse connection connection back to the mail server wherefrom the email message was transmitted. In an alternative embodiment, as shown in FIG. 2, the reverse connection connection is made with a mail server that is other than the one used to send the initial email message. Any information sent using the reverse connection to the mail server appears in a user account, which for example may be a Post Office Protocol (POP) account, of the mail server. The POP account is identified by the email address of the message sent through the reverse connection.

When a reverse email message is transmitted to a reverse connection connection to a mail server, the portion of the reverse email message containing information to be faxed is converted to a recognized fax format. That is, in the event the router does not recognize the email message in a way so as to properly convert it, or portions of it, to a recognized fax format, the mail server may so convert the reverse email message, or portions thereof, to a recognized fax format, such as TIFF. Alternatively equipment other than a mail server may be employed for such conversion. Such other equipment includes a server or a PC. Yet another alternative is to have an equipment capable of such conversion to remotely dial-into the mail server after the reverse email message arrives and is stored in the mail sever. The equipment would dial-in and remotely convert the reverse email message to a recognized fax format.

The reverse connection, i.e. communication back to the mail server by the router is aborted when and if it is determined that the fax portion of the email message was successfully transmitted to the designated fax recipients thereof. If on the other hand, the fax portion of the email message was not successfully transmitted to one or more of the designated fax recipients, the reverse connection is "gracefully" terminated following transmission of the email message through the reverse connection back to the mail server. There is a difference in the way the reverse connection is "gracefully" terminate as opposed to the way it is "aborted" with this difference being discussed later. For now, suffice it to say that if the connection has not been terminated "gracefully", the mail server disregards the information or data that may have been transmitted through the reverse connection.

While the reverse connection may be either "aborted" or disconnected "gracefully", the forward connection (the path established from the mail server to the router) is always disconnected "gracefully". As previously indicated, the forward connection is used to carry the forward email message and the reverse connection is used to carry the reverse email message.

The router 24 processes the message 30 and appends the context information thereto to form the appended message 32, which is then sent back to the mail server 34 by the router 24.

Although the mail server 34 is shown in FIG. 2 to be different from the original mail server 23, which was used for sending the email message, the two servers, in one embodiment of the present invention, may be the same and in another embodiment of the present invention may be physically two different servers.

The appended email message 32 with perhaps additional, different or the same context information, forming the message 37, is sent back to the router 24 through the PSTN 35. The router 24 processes the message again with the benefit of having the context information from the first pass. If at the end of the processing, it is determined that yet another pass is necessary, the message having further context information appended thereto is sent back to the mail server 34 for a second re-transmission. The number of times the message is re-transmitted may be as many times as is necessary for the message to be adequately processed. Processing of the message includes successful transmission of all of the fax pages to the requisite fax message. In the example of FIG. 2, one fax machine 36 finally receives the message 30. Other than the fax machine 36, other fax machines may similarly receive the same message if so desired. Additionally, in FIG. 2, while not shown, messages 38 and 40 are transmitted from a source other than the email message 21 but they are processed in the same manner as described above with respect to message 30 except that they are processed by different routers, i.e. 26 and 28.

The email message 21, in FIG. 2, in alternative embodiments, includes a plurality of email addresses, although, alternatively, the email message 21 may include one email address. In the case where the email message 21 includes more than one address, it is accordingly transmitted to more than one destination or fax recipient.

Multiple passes of an email message and maintenance of the history or the context information pertaining to each pass allows for the fax system 200, in FIG. 2, to behave like a fax system that makes available the entire message to the router which is processing the message. This is due to each additional pass utilizing the information obtained from previous passes thereby effectively making the entire message available to the router.

The email message, when transferred from the mail server to the router, is done so in real-time. That is, the router is not in a position to be aware of the information previously received for the same message as it does not store any portions of the message. In the embodiments of the present invention, the router does not include enough memory to store an entire message and even if it did have enough memory, in the case where this memory is in the form of volatile memory, such as RAM, if power to the system was for some reason interrupted, the stored message is lost. Accordingly, as the router receives the email message in real-time and is not in a position to (reliably) store the message, it uses the memory of the mail server to do the same. The memory within the mail server that is used for such storage is preferably nonvolatile memory such as flash or EEPROM to ensure against loss of data due to power interruptions. In accordance with the present invention, the message is stored in the mail server for various reasons. One reason is due to failure to successfully transmit fax information extracted from the email message to one or more fax recipients. Another reason is due to receiving a large file from the mail server, such as an email message including TIFF (or information that need be converted to TIFF or other fax format) that is simply too large for storage within the router, yet must be processed in real-time. In both cases, the email message goes through multiple passes (transmissions between the router and the mail server) where the mail server is used to store the email message plus additional information such as context information.

It should be noted that the fax system 200 of FIG. 2, in one embodiment, allows for the context information to be accumulative wherein the history of the places (mail servers) through which the message has traveled is included in the history of the message. In another embodiment, the context information includes the address of the last mail server through which the message has traveled and in yet another embodiment the context information does not include any information regarding the places the message has traveled therethrough. The example of context information provided in FIG. 5 herein discloses an example of the last embodiment.

Figure 3:
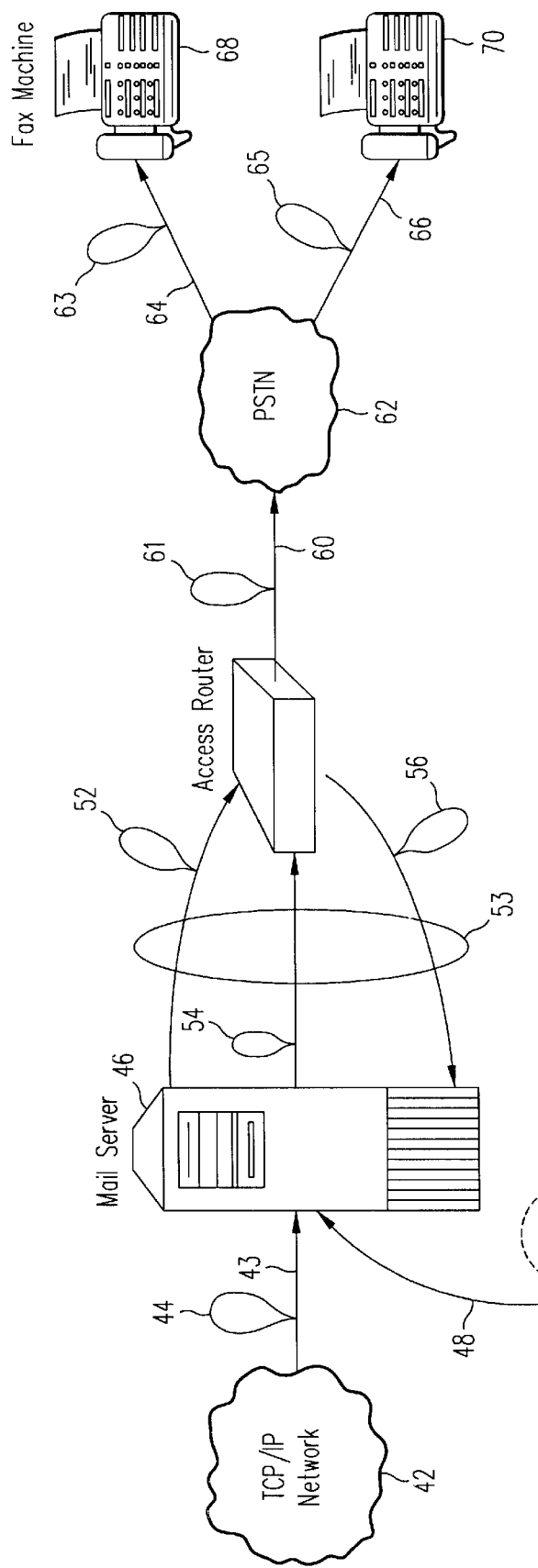
FIG. 3 depicts further details of the embodiment shown in FIG. 2.

The interaction between the router 24 and the mail server 23, when multiple passes are required, is further elucidated in FIG. 3. In FIG. 3, a mail server 46 is shown to be coupled through a network communication channel 43 for receiving email messages from sources (not shown in FIG. 3) such as a PC having modem capability or other like communications devices, such as another mail server. The mail server 46 is coupled to an edge router device 58 through a mail server communication link 53. The router device 58 is further shown coupled, through PSTN 62 and the communication links (4 and 66 to the fax machines 68 and 70, respectively.

In operation, an email message 44, coupled through the network 42, is transmitted to the mail server 46. The mail server 46 sends the message 44, as email message 54, through the link 53 to the router device 58. According to the embodiments of the present invention, simultaneous with the arrival of the email message 54, an outbound (or reverse) path is established for transmitting an outbound email message 56 (or reverse email message) back to the mail server 46. The outbound email message 56 is created in the router 58, encapsulates the original email message 54, and further includes context information. The outbound email message 56 and the context information is at times referred to as an reverse email message. The email message 54 is similar to the forward email message discussed with reference to FIG. 2 and the outbound email message 56 is the reverse email message discussed with reference to the same figure.

The outbound email message 56 is not transmitted back to the mail server 46 unless it is determined that an additional pass is required for processing this message. If another pass is not required, transmission of the outbound email message 56 is aborted. Aborting a transmission is performed by failing to transmit what is commonly referred to in email transmission terminology, as the terminating dot for this connection. On the other hand, if it is decided that al additional pass is required for this message, the context information acquired during the first pass is appended at the end of the outbound email message 56 (which, as previously indicated, includes the contents of the message 54) and the outbound email message 56 is transmitted to the mail server 46 by dot-terminating the transmission, which ends the connection "gracefully".

The outbound email message's destination address is a predefined user account, such as a POP account, maintained within the mail server 46. A POP account is similar to an email account and is basically a user account. For example, each person whose email account resides in a particular mail server will have a POP account, or an email account, designated in a particular mail server where information, in the form of an email, is transferred to and from the user that is identified by the POP account. Thus, the router 58 has to have a unique alias which is different from the alias used as the destination for the original email 54 since the latter may have an address specifying a whole array of routers in the local area, only one of which is 58.

The outbound email message 56 encapsulates the original email 54 and has appended thereto, context information acquired from the first pass. In one embodiment of the present invention, the context information is appended to the end of the message. When a router (particular note should be taken of the notion that during various passes, the reverse email message may travel through different routers or alternatively travel through the same router) receives the message for the second pass, it would need the context of the previous pass at the beginning of the message in order to parse the message for the second time. Accordingly, prior to the second transfer of the message from the mail server to the router, the context information may be transferred to the front of the original message. To accomplish the transfer of the context information from the end to the front of the message, the preprocessing mechanism in the user account is employed. The preprocessing mechanism can be performed one of two ways. One pre-processing mechanism is to have a dial-up connection to the mail server and when a dial-up connection is established, to move the context information to the front of the message and perhaps perform other tasks, such as further modification of the overhead information associated with the message. Another example is to perform the foregoing manipulation of the message with the mail server without establishing a dial-up connection. In other words, the preprocessing may be network-distributed or simply performed locally within the mail server.

The mail server name is used as the alias domain with the outbound email message 56. In this manner, when the mail server 46 receives the outbound email message 56 and determines that the message domain is local to the mail server, it will preprocess the message before sending it back out to the router 58. The rules for preprocessing are specified in a predefined file, such as a 'forward' file or an executable file, stored in the home directory of the POP account within the mail server. The 'forward' file invokes an executable file, which is specifically provided to move the context information from the end to the front of the outbound email message 56. This is done in the POP account.

Once the context information is appended to the front of the outbound email message 56, the modified email message 52 is sent back to the router 58 for further processing. Again, it should be noted that the modified email message 52 may be routed to a router other than the same router that was used to provide the message to the mail server, in this case, router 58, but for purposes of providing an example of the operation of an embodiment of the present invention, the message 52 is shown to be transmitted back to the router 58. Now the router can use the context of the previous pass while parsing the message. This process is repeated until the processing of the message is completed satisfactorily.

In one embodiment of the present invention, the context information is not stored in the router 58 when it is provided to the latter as a part of the modified message 52. This further reduces storage capacity requirements pertaining to the router 58 thereby reducing the size and costs associated with manufacture thereof. Alternatively, the context information may be stored in the router 58.

The processed messages, which are in the form of faxes 61, are coupled through 60 and the PSTN 62, to the fax machines 68 and 70 through links 64 and 66, respectively. Fax machine 68 receives a message 63 via the link 64 where the message 63 had to go through one pass only (or was transmitted from the mail server to the router only one time). Fax machine 70 receives the message 65 through the link 66, which had to go through several passes before it was completely processed as described above.

Figure 4:
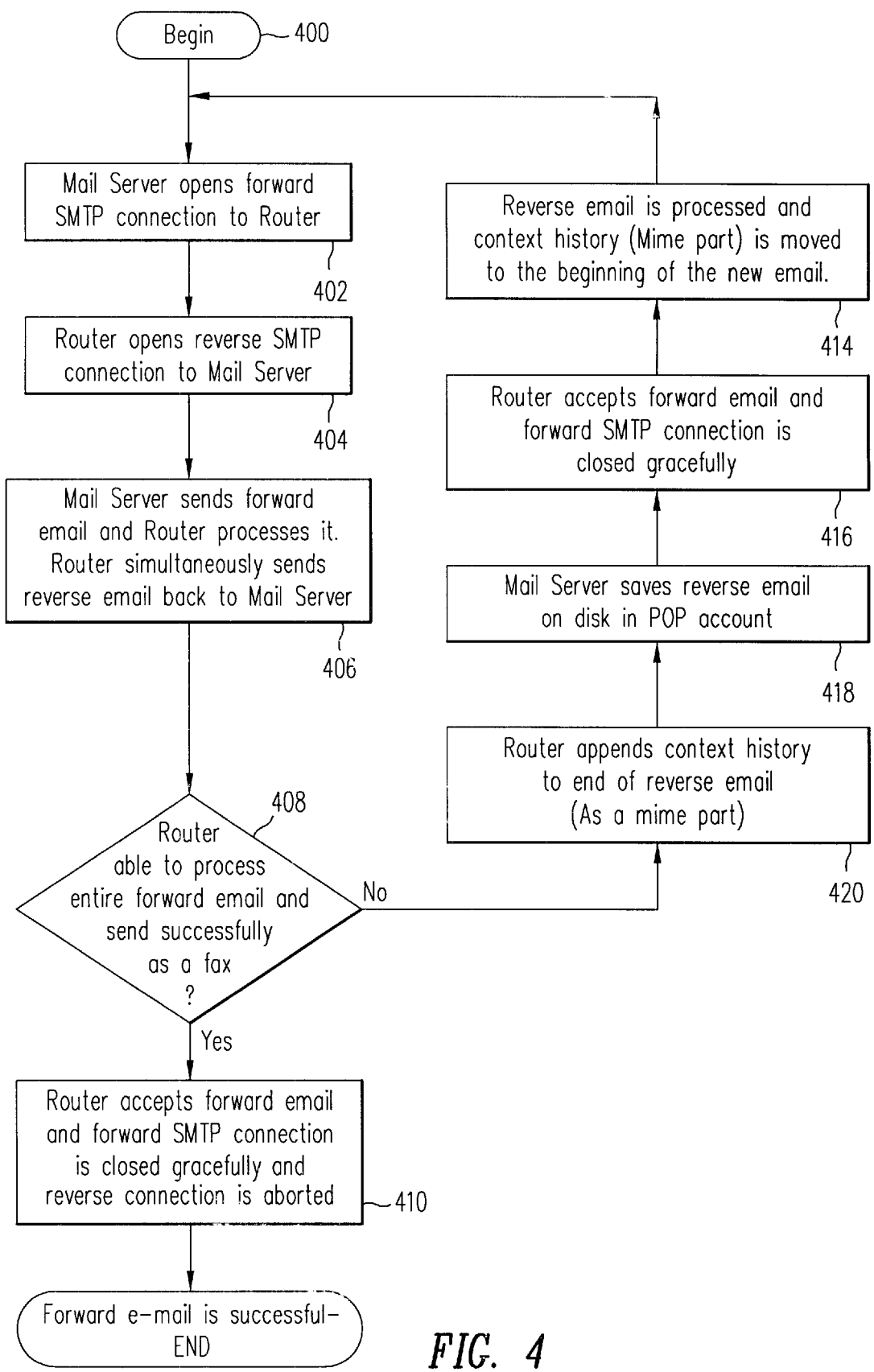
FIG. 4 shows a flow chart of the steps performed by the systems discussed in FIGS. 2 and 3 in accordance with the principles of the present invention.

FIG. 4, there is shown a flow chart of the steps performed by the systems discussed in FIGS. 2 and 3 in accordance with the principles of the present invention. In one embodiment, these steps are performed by a processor included within the router or alternatively state machines or other types of modules designed to perform the appropriate steps. In the case where a processor such as a Central Processing Unit (CPU) is employed, firmware or code is stored in RAM and the CPU executes this code to effectuate the execution of the steps presented in FIG. 4.

In FIG. 4, at 400, the process begins and at 402 the mail server (mail server 23 in FIG. 2 and mail server 46 in FIG. 3) opens or establishes a forward Simple Mail Transfer Protocol (SMTP) connection to a route (an example of such a router is provided in FIG. 2 as router 24 and in FIG. 3 as router 58). To use the examples of FIGS. 2 and 3, this connection would be that referenced by the number 25 in FIG. 2 and the link coupling the message 54 in FIG. 3. At 404, the router opens or establishes a reverse SMTP connection to the mail server. In FIG. 3, this connection is shown in link 53 to be the one coupling the message 56. At 406 (in FIG. 4), the mail server sends a forward email message and the router processes this email message. The forward email message in FIG. 3 is shown by the reference number 54. The processing of the email message by the router entails separating the tax contents of the email message for transmission or attempted transmission of the separated fax contexts, in the form of a fax message, to the appropriate fax machine(s). Further at step 406, the router simultaneously sends a reverse email back to the mail server.

The reverse email message includes essentially the same contents as that of the forward email message with the addition of context information and an address that is different than that of the address of the email user. Rather, the address included in the reverse email message is the address of the user account to which the reverse email message is directed.

At 408, a determination is made by the router as to whether or not the forward email message of step 406 was processed successfully and in its entirety. This determination includes whether or not the email message was successfully transformed into a recognized fax format and that all of the pages of the fax contents were successfully transmitted to appropriate fax machine(s). In the case where the fax contents of the email message, at step 406, was transmitted successfully in its entirety, the router, at step 410, acknowledges, acceptance of the forward email message and gracefully closes the forward SMTP connection and aborts the reverse connection (or the connection in FIG. 3 shown to carry 54). Thereafter, at step 412, since the forward email message transmission is successful, the process ends.

At 408, in the case where the entire fax contents of the email message, at step 406, was not successfully transmitted in its entirety, the process continues to step 420 where the router appends context information (or history) to the end of the reverse email and sends the appended reverse email to the mail server and "gracefully" closed the connection. At step 418, the mail server saves the reverse email message within the POP account of the mass storage medium such as a hard disk or flash memory of the mail server. Next, at step 416, the router acknowledges acceptance of the forward email message and "gracefully" closes the forward SMTP connection.

At step 414, the reverse email message is processed and context history is moved to the beginning portion of the processed reverse email message, which then becomes the new email message. It should be noted that the passes of the message, beyond the first pass, which would include sending the email message including context information from the router back to the mail server, would occur due to the failure to process the message the first time it is sent from a mail server to a router.

In one embodiment of the present invention, as the message is processed each time prior to another pass, the portion of the message that is successfully transmitted to its final fax destination is no longer included in the message as it travels through further passes. This is the way in which re-transmission of the entire message is avoided thereby reducing the transmission time between the router and destination fax machines, which in turn, reduces costs to the user as well as reducing network traffic. Alternatively and as earlier noted, the entire message is re-transmitted during further passes.

In FIG. 5 an example of the contents of a history or context information is shown at 500. The context information is shown to include a field 502 for indicating the number of pages transmitted, a field 504 for indicating the type of TIFF file included in the message transmitted, a field 506 for indicating the particular (fax) recipients that have failed to receive the fax message and the number of fax pages among the fax pages of the message that have failed, a field 508 for indicating the number of times the message has been attempted for transmission to a particular recipient and a field 510 for identifying (the address of) the original destination recipient(s). This context information accompanies the email message that has yet to be successfully transmitted and received, as noted in more detail above.

Optionally, the context information includes other types of information regarding the transmission of the tax information or even the type of fax recipients receiving the fax information. For example, shown in FIG. 5, at 512, the previous place or places where the email message, which includes the tax information, has traveled may be included in the context information. These places would be the previous mail server(s) and/or router(s) through which the message has traveled. This information would be helpful in determining a history of events. Another useful information is shown at 514 to include capability of the fax recipients. For example, the speed of the fax recipients may be included in the context information. This information is obtained from the fax recipient during the first time the fax message is sent thereto unsuccessfully and it is done through handshaking protocol, commonly known to those in the field. Other capabilities or characteristics of the fax recipients may be similarly included within the context information. This type, of information may be used for, for example, grouping the fax recipients that have approximately the same speeds together so that the length of time that would be required to receive the entire fax message would be similar. One of the advantages of this technique is an increase in the overall throughput of the system and thus an increase in system performance.

In FIG. 5, there is additionally shown, 516, which includes information regarding fax recipients' past history. In other words, during previous transmissions that have not been entirely successful, there may be information acquired regarding the fax recipients that could be of assistance. This acquired information may be the speed of the fax recipients, the particular encoding scheme being employed and other fax-device capabilities.

In accordance with one embodiment of the present invention, upon re-transmission of the fax message, it is re-transmitted, by the router, only to those recipients that did not properly receive a previous transmission of the fax message. The router is aware of which fax recipients (or devices) that did not properly receive the message due to the inclusion of such information within the context information. However, the first time the router becomes aware of such information is through the use of information sent by the fax recipients. That is, as understood by those skilled in the art, every time a page is faxed to a fax recipient, the latter transmits confirmation of receipt of that page back to the transmitter, in this case, the router. Accordingly, the router is aware of which pages were successfully or otherwise, unsuccessfully, transmitted to which fax recipients.

It should be noted that the present invention is further applicable to transmission of fax information that is too large to store within the router. For example, a TIFF or other like fax files, are oftentimes large in volume and cannot be entirely stored within the router, as they are received by the router in real-time. In such a case, the mail server is used as a secondary storage device for accumulation of the packets of the email message prior to transmission of the fax information contained within the email. In such a case, as each email packet (which includes fax contents) arrives at the router, it is re-transmitted in the form of a reverse email message having context information, back to a mail server where it is saved. The accumulation of all of the packets, through multiple passes, of an email message by the mail server finally make up an entire email message and when this occurs, the email message is transmitted to the router and faxed by the router to the fax recipient(s).

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What we claim is:

1. An email communication system employed in a packet switching network environment for use by email users for transmission of an email message including information to be converted to at least one fax message, through the packet switching network environment, the fax message being received by at least one fax recipient, comprising:

a network device for communication with one or more mail servers, the mail server for receiving an email message including information to be converted to at least one fax message from an email user and for coupling the received email message, as a forward email message, through a forward connection to the network device, the network device responsive to the forward email message and operative to convert the forward email message to a fax message for transmission thereof to at least one fax recipient, the network device further operative to append context information to the forward email message, forming a reverse email message, for transmission thereof back to one of the mail servers if transmission of the fax message to the at least one fax recipient is unsuccessful, wherein the mail server receiving the reverse email message is used to store the reverse email message until the mail server is ready to resend the same to the fax device thereby avoiding the need for secondary storage, for storing of the email message, within the network device.

2. An email system as recited in claim 1 wherein the network device is a router.

3. An email system as recited in claim 1 wherein the network device is further operative to establish a reverse connection from the network device back to the mail server upon receipt of the email message, the reverse connection for use in transmitting the reverse email message back to the mail server upon unsuccessful transmission of the fax message to the fax recipient(s).

4. An email system as recited in claim 3 wherein upon transmission of the reverse email message back to the mail server, the reverse connection is "gracefully" terminated.

5. An email system as recited in claim 3 wherein upon successful transmission of the fax message to the fax recipient, the reverse connection is aborted.

6. An email system as recited in claim 3 wherein the network device is further operative to receive the transmitted reverse email message, convert the reverse email message into a fax message and based upon the context information of the reverse email message, transmit the fax message to at least one of the fax devices.

7. An email system as recited in claim 1 including an Internet Protocol for communication of information between the email user and the mail server.

8. An email system as recited in claim 1 further including a communication link for coupling the network device to the tax recipients.

9. An email system as recited in claim 8 wherein the communication link employs Public Switching Telephone Network (PSTN).

10. An email system as recited in claim 1 wherein the forward connection is an SMTP connection.

11. An email system as recited in claim 1 wherein the fax message is in the form of TIFF.

12. An email system as recited in claim 1 wherein the context information includes the number of pages included within the fax message.

13. An email system as recited in claim 12 wherein the context information includes the number of pages within the tax message that have failed to be successfully transmitted to the fax recipient(s).

14. An email system as recited in claim 1 wherein the context information further includes the number of fax recipient(s) that have not successfully received the fax message.

15. An email system as recited in claim 1 wherein the context information further includes the number of times the fax message has been transmitted to the same fax recipient(s).

16. An email system as recited in claim 1 wherein the context information further includes an address identifying, the fax recipient to which the fax message was originally directed by the email user.

17. An email system as recited in claim 1 wherein the context information further includes identification information regarding the mail server(s) that the email message has traveled therethrough.

18. An email system as recited in claim 1 wherein the context information further includes information regarding capabilities of the fax recipient(s).

19. An email system as recited in claim 1 wherein the context information further includes information regarding capabilities of the fax recipient(s) to which the fax message was previously transmitted.

20. An email system as recited in claim 1 wherein the mail server includes storage space for storing the reverse email message.

21. An email system as recited in claim 1 wherein upon successful transmission of the reverse email message to the mail server, the reverse email message is converted to a recognized format as the fax message by remote dial-into the mail server.

22. An email system as recited in claim 21 wherein the recognized fax format is TIFF.

23. An email system as recited in claim 1 wherein transmission of the fax message to at least one fax recipients in performed in real-time.

24. An email system as recited in claim 1 wherein the network device is operative to receive the forward email message in real-time.

25. A method employed in a packet switching network environment for communicating email messages, including information to be converted to at least one fax message, between email users and fax recipients comprising:
    receiving a forward email message including information to be converted to at least one fax message;
    converting the received forward email message to at least one fax message for transmission thereof to at least one fax recipient;
    establishing a reverse connection for coupling the reverse email message to a mail server;
    transmitting the fax message to the at least one fax recipient;
    appending context information to the received forward email message to form an reverse email message for transmission thereof back to one of the mail servers; and
    upon unsuccessful transmission of the fax message to the at least one fax recipient, using the mail server to store the reverse email message until the network device is ready to re-transmit the same to the fax device thereby avoiding the need for secondary storage within the network device.

26. A method employed in a packet switching network environment as recited in claim 25 further including the steps of transmitting the reverse email message back to the mail server and upon transmission of the reverse email message, terminating the reverse connection "gracefully".

27. A method employed in a packet switching network environment as recited in claim 25 wherein upon successful transmission of the fax message to the fax recipient, the reverse connection is aborted.

28. An email communication system employed in a packet switching network environment for use by email users for transmission of an email message including information to be converted to at least one fax message, through the packet switching network environment, the fax message being received by at least one fax recipient, comprising:
    a network device for communication with one or more mail servers, the mail server for receiving an email message including information to be converted to at least one fax message from an email user and for coupling the received email message, as a forward email message, in the form of packets, in real-time, through a forward connection to the network device, the network device receiving packets of the forward email message, in real-time, and operative to append context information to each of the packets of the forward email message for transmission thereof back to the mail server during a pass, each packet of the forward email message having appended thereto context information forming a reverse email message, the network device operative to transmit each of the reverse email messages back to one of the mail servers during a pass, all of the packets of the forward email message being transmitted by the network device to the mail server during multiple passes and upon accumulation of all of the packets of the email message in the mail server, the mail server for transmitting the forward email message to the network device and the network device operative to convert the transmitted forward email message to a fax message for transmission thereof to at least one fax recipient, wherein the mail server is used to store all of the packets of the email message during multiple passes thereby avoiding the need for secondary storage within the network device.

29. An email communication system as recited in claim 28 wherein the fax message is in the form of TIFF.

30. A method for use in an email communication system employed in a packet switching network environment for use by email users for transmission of an email message including information to be converted to at least one fax message, through the packet switching network environment, the fax message being received by at least one fax recipient, the email communication system including a network device for communication with one or more mail servers, the mail server for receiving an email message including information to be converted to at least one fax message from an email user and for coupling the received email message, in packet form, as a forward email message, to the network device, the method comprising:
    receiving at least one packet of a forward email message including information to be converted to at least one fax message through a forward connection;
    appending context information to the received forward message to form a reverse email message for transmission thereof back to one of the mail servers during a pass;
    during the first pass, transmitting the reverse email message for storage thereof in the at least one of the mail servers;
    receiving further packets of the forward email message;
    appending further context information to the received further packets of the forward email message to form further reverse email messages:
    during further passes, transmitting the further reverse email messages for storage thereof in the at least one of the mail servers;

upon receipt of all of the packets of the forward email message; converting the received forward email message to a fax message for transmission thereof to at least one fax recipient; and transmitting the fax message to the at least one of the fax recipients, wherein the mail server is used to store all of the packets of the email message during multiple passes thereby avoiding the need for secondary storage within the network device.

31. A method for use in an email communication system as recited in claim 30 wherein the forward email message is received in real-time.

32. A method for use in an email communication system as recited in claim 30 wherein said during said converting step, the forward email message is converted to TIFF.

33. An email communication system employed in a packet switching network environment for use by email users for transmission of an email message including information to be converted to at least one fax message, through the packet switching network environment, the fax message being received by at least one fax recipient, comprising:

a network device for communication with one or more mail servers, the mail server for receiving an email message including information to be converted to at least one fax message from an email user and for coupling the received email message, as a forward email message, through a forward connection to the network device, the network device responsive to the forward email message and operative to convert the forward email message to a fax message for transmission thereof to at least one fax recipient, the network device further operative to append context information to the forward email message, forming a reverse email message, for transmission thereof back to one of the mail servers, the network device further operative to begin transmission of the reverse email message back to at least one of the mail servers and to transmit the fax message to the at least one of the fax recipients and upon unsuccessful transmission of the fax message, the network device operative to complete transmission of the reverse email message to the at least one of the mail servers, wherein the mail server receiving the reverse email message is used to store the reverse email message until the mail server is ready to re-send the same to the fax device thereby avoiding the need for secondary storage within the network device.

34. An email communication system as recited in claim 33 wherein the network device begins transmission of the reverse email message immediately upon receipt of the forward email message.

35. An email communication system as recited in claim 33 further including a reverse connection for coupling the reverse email message from the network device to the at least one of the mail servers.

36. An email communication system as recited in claim 35 wherein upon successful transmission of the forward email message to the at least one of the fax devices, the reverse connection is aborted.

37. An email communication system as recited in claim 33 wherein upon unsuccessful transmission of the forward email message to the at least one of the fax devices, transmission of the reverse email message back to the mail server is completed and the reverse connection is "gracefully" terminated.

38. An email communication system as recited in claim 33 wherein the network device is a router.

\* \* \* \* \*